(12) United States Patent
Saur

(10) Patent No.: US 12,463,578 B2
(45) Date of Patent: Nov. 4, 2025

(54) OPERATING METHOD AND POWER ELECTRONICS FOR AN ELECTRIC MOTOR

(71) Applicant: AUDI AG, Ingolstadt (DE)

(72) Inventor: Michael Saur, Munich (DE)

(*) Notice: Subject to any disclaimer, the term of this patent is extended or adjusted under 35 U.S.C. 154(b) by 150 days.

(21) Appl. No.: 18/058,180

(22) Filed: Nov. 22, 2022

(65) Prior Publication Data

US 2023/0163711 A1 May 25, 2023

(30) Foreign Application Priority Data

Nov. 25, 2021 (DE) .......................... 102021130907.7

(51) Int. Cl.
*H02P 29/00* (2016.01)

(52) U.S. Cl.
CPC .................................. *H02P 29/00* (2013.01)

(58) Field of Classification Search
CPC ...... H02P 2207/05; H02P 29/00; H02P 29/62; H02P 27/08; H02P 25/022; H02P 25/08; H02P 25/064
See application file for complete search history.

(56) References Cited

U.S. PATENT DOCUMENTS

| | | | |
|---|---|---|---|
| 4,491,768 A * | 1/1985 | Slicker | B60L 53/22 318/811 |
| 4,904,919 A * | 2/1990 | McNaughton | H02P 27/08 318/811 |
| 5,107,191 A * | 4/1992 | Lowndes | H02J 7/00714 320/118 |
| 5,828,200 A * | 10/1998 | Ligman | H02H 7/0858 318/729 |
| 6,218,795 B1* | 4/2001 | Syukuri | H02P 6/182 318/400.07 |
| 6,433,496 B1* | 8/2002 | Kawagoshi | H02P 6/085 318/459 |
| 7,064,510 B2* | 6/2006 | Brannen | H02P 6/34 318/400.06 |
| 7,928,686 B2* | 4/2011 | Saha | H02P 27/08 318/807 |
| 9,525,376 B2* | 12/2016 | Box | H02P 25/026 |
| 2009/0284202 A1* | 11/2009 | Miura | G01K 7/42 318/473 |
| 2011/0018478 A1* | 1/2011 | Kobayashi | H02M 7/53873 318/257 |
| 2014/0054986 A1* | 2/2014 | Hirai | H02K 9/19 310/53 |
| 2014/0184114 A1* | 7/2014 | Omata | H02N 2/0075 318/400.09 |
| 2016/0006381 A1* | 1/2016 | Park | H02P 21/10 318/400.02 |

(Continued)

FOREIGN PATENT DOCUMENTS

| | | |
|---|---|---|
| CN | 101603728 A | 12/2009 |
| DE | 102016211762 A1 | 1/2018 |
| DE | 102017220941 A1 | 5/2019 |

(Continued)

*Primary Examiner* — Rina I Duda
(74) *Attorney, Agent, or Firm* — Seed Intellectual Property Law Group LLP

(57) ABSTRACT

A method for operating an electric motor is provided which includes power electronics of a drive system operating an electric motor of the drive system using clock signals, as well as power electronics for a drive system and a vehicle.

8 Claims, 2 Drawing Sheets

(56) References Cited

U.S. PATENT DOCUMENTS

2016/0079637 A1* 3/2016 Nemesh ............ H01M 10/6569
  429/62
2019/0144030 A1* 5/2019 Sakai ........................ G06F 1/12
  318/3

FOREIGN PATENT DOCUMENTS

| DE | 102019133634 A1 | 6/2021 |
|----|-----------------|--------|
| JP | 2018082544 A    | 5/2018 |

* cited by examiner

OPERATING METHOD AND POWER ELECTRONICS FOR AN ELECTRIC MOTOR

BACKGROUND

Technical Field

Embodiments of the invention relate to a method for operating an electric motor, in which power electronics of a drive system operate an electric motor of the drive system by means of clock signals. Furthermore, embodiments of the invention relate to power electronics for a drive system and a vehicle.

Description of the Related Art

Operating methods are used to drive an electric motor at an operating point of maximum power of the electric motor. The electric motor, together with a traction battery and power electronics, can, in particular, be part of a drive system of an electrically drivable vehicle, for example, an electric vehicle or a hybrid vehicle.

During operation, the electric motor inevitably generates heat in components of the electric motor by means of a magnetic flux. Any operating method for the electric motor must therefore control a temperature of the electric motor. Temperature control must therefore comprise removal of heat. In some embodiments, heat can be removed by a selectively used fluid flowing through the electric motor. Even an electric motor-like arrangement with a stator and a rotor can be used to heat a fluid.

CN 101 603 728 A, for example, discloses an electromagnetic water heater having a flow-through housing, a shaft passing through the flow-through housing, a rotor arranged inside the flow-through housing and held in a rotationally fixed manner on the shaft, the rotor having a sleeved-on permanent magnet and a motor disposed outside the flow-through housing for rotating the shaft. During operation, a harmonic magnetic flux generated by one of the rotating permanent magnets heats a stator held on the inside of the flow-through housing and water flowing between the rotor and the stator.

Moreover, the temperature control may comprise an avoidance of heat generation by the electric motor.

For example, DE 10 2017 220 941 A1 discloses an electric motor having a stator and a rotor comprising permanent magnets. The power electronics controlling the stator selectively superimposes additional harmonics of a rotational frequency of the rotor on an alternating current voltage supplied to the stator. The additional harmonics heat the rotor, whereby the permanent magnets become demagnetized. This avoids a heating of the stator by the permanent magnets and prevents a defect of the electric motor resulting from overheating.

The temperature control can also serve to favorably adjust a physical quantity determining an efficiency of the electric motor by means of the temperature of the electric motor, by way of example, to achieve a low flux density of a rotor of the electric motor.

JP 2018 082 544 A discloses an operating method for an electric motor in which magnets of a rotor of the electric motor are selectively heated by superimposing harmonics of the rotor rotational frequency on an alternating current voltage supplied to the stator of the electric motor. As the temperature of the magnets increases, the flux density of the rotor decreases.

However, the selective superimposition of an alternating current voltage with harmonics of the rotor rotational frequency increases the complexity of the power electronics operating the electric motor. The increased complexity of the power electronics requires an increased computing power of the power electronics and/or an increased memory space of the power electronics, which is undesirable.

BRIEF SUMMARY

Some embodiments provide a method for operating an electric motor which heats a rotor without selectively superimposing additional harmonics of the rotor rotational frequency on an alternating current voltage supplied to the stator. Some embodiments provide power electronics and a vehicle.

One embodiment includes a method for operating an electric motor, in which power electronics of a drive system operate an electric motor of the drive system by means of clock signals. The power electronics generates an alternating current voltage that is supplied to the electric motor. In many drive systems, the power electronics generate a square-wave alternating current voltage at an operating point of the electric motor where the electric motor is providing maximum power. The supply of a square-wave alternating current voltage is usually referred to as clock signals.

A square-wave alternating current voltage is understood to be a periodic step-shaped alternating current voltage which has a square-wave oscillation, which is to say a square-wave fundamental oscillation, and possibly one or more superimposed square-wave oscillations. The superimposed square-wave oscillations can each differ in a frequency and/or in an amplitude from the square-wave fundamental oscillation. In this case, a frequency of the square-wave fundamental oscillation is equal to a rotational frequency of a rotor of the electric motor multiplied by a pole-pair number of a stator of the electric motor.

In some embodiments, the electric motor is selectively operated at each operating point of the electric motor by means of the clock signals. In other words, the power electronics do not apply the clock signals exclusively in an operating point of maximum power but can apply the clock signals arbitrarily in any power range of the electric motor.

A harmonic of a sinusoidal fundamental oscillation is generally understood to be any oscillation which has the same shape as the fundamental oscillation and a frequency which is an integer multiple of a frequency of the fundamental oscillation.

A square-wave alternating current voltage is therefore a superposition of a (in the precise limit case, infinite) plurality of harmonics of a sinusoidal fundamental oscillation. In contrast with alternating currents of other forms, the low harmonics of a square-wave alternating current voltage, for example, the fifth or the seventh harmonic, have relatively high amplitudes.

Since the rotor rotates with a frequency of the fundamental oscillation divided by the number of pole pairs of the stator, the harmonics rotate asynchronously to the rotor and as a consequence, in contrast to the fundamental oscillation, do not generate a constant torque acting on the rotor. The harmonics do however generate a magnetic flux proportional to the respective amplitude, which induces eddy currents in the rotor. The harmonics, which are asynchronous to the rotor, are usually called flux harmonics. The eddy currents induced by the flux harmonics very efficiently heat the rotor, which is to say both laminations forming a rotor core of the rotor and magnets of the rotor held on the rotor core.

As a consequence, clock signals allow rapid heating of the rotor thanks to the flux harmonics contained in the square-wave alternating current voltage, without selectively superimposing additional flux harmonics on the alternating current voltage. The power electronics apply clock signals as needed at any operating point of the electric motor, which is to say, independently of any operating point of the electric motor, to rapidly heat the rotor of the electric motor.

The power electronics may provide the clock signals for an operating point with a power of the electric motor below a maximum power of the electric motor. A power-related efficiency of the electric motor is relatively low for the clock signals because of the strongly contained flux harmonics. This is the case because the flux harmonics do not contribute to the torque provided by the electric motor. However, the low efficiency of the clock signals is accepted at the operating point with maximum power in order to increase the maximum power of the electric motor.

The low efficiency of the clock signals can be (partly) compensated or even overcompensated by an increased efficiency of the power electronics, since with clock signals an ohmic loss of the power electronics or a power loss of an inverter of the power electronics are reduced.

At operating points below the maximum power, on the other hand, known power electronics apply timings that differ from clock signals, which are more favorable with regard to the power-related efficiency of the electric motor. Notwithstanding the relatively unfavorable efficiency, the power electronics may selectively apply the clock signals instead of these timings in order to heat the rotor of the electric motor.

In particular, the power electronics provides the clock signals for an operating point having a power of the electric motor that is below a limit power rating of the electric motor determined by a base frequency of the electric motor for a pulse width modulation instead of the pulse width modulation. Below the limit power rating, which corresponds, for example, to a driving speed of approximately 70 km/h for an electrically driven vehicle, the power electronics uses pulse width modulation (PWM) as timing. In operating points of the electric motor in this lower power range, the power electronics can optionally use clock signals instead of pulse width modulation to heat the rotor of the electric motor, despite the relatively unfavorable efficiency.

Alternatively, or additionally, the power electronics provides the clock signals for an operating point with a power of the electric motor above a limit power rating of the electric motor for a pulse width modulation instead of an overmodulation. Above the limit power rating, which corresponds, for example, to a driving speed of about 70 km/h in an electrically driven vehicle, the power electronics applies overmodulation with relatively small blocks as timing. At operating points of the electric motor in this upper power range, the power electronics can optionally use clock signals instead of overmodulation to heat the rotor of the electric motor, despite the relatively unfavorable efficiency.

At least one flux harmonic of the clock signals in a d/q reference frame rotating with the rotor may have a d component. In the d/q reference frame, the d component indicates a magnetic flux that does not apply a torque to the rotor, whereas the q component indicates a torque acting on the rotor.

In some embodiments, the power electronics heats a rotor and/or a stator of the electric motor by means of the clock signals. By means of the clock signals, the stator of the electric motor can also be heated, in addition to the rotor.

The rotor and/or the stator may heat an oil arranged in the electric motor and flowing around the rotor and/or the stator for heating a traction battery of an electrically drivable vehicle, which is to say an electric vehicle or a hybrid vehicle. The oil flowing around the rotor and/or the stator can flow through a cylindrical gap between the rotor and the stator. The rotor and the stator together rapidly cause a large heat input into the flowing oil, which correspondingly leads to a rapid and strong heating of the oil and an equally rapid and strong heating of the traction battery.

In some embodiments, a permanently excited synchronous motor (PSM), a synchronous reluctance motor (SynRM) or a separately excited synchronous motor (SSM) is operated as the electric motor. In addition to permanently excited synchronous motors, the method described herein is also suitable for synchronous reluctance motors and separately excited synchronous motors. In this respect, there are numerous possible applications for the embodiments described herein.

Another embodiment includes a power electronics for a drive system. The power electronics comprises an inverter, which provides an alternating current voltage on the output side for operating an electric motor of the drive system. The power electronics is configured to provide different timings of the alternating current voltage. The timings of the alternating current voltage include pulse width modulation, overmodulation, and clock signals. Known power electronics apply clock signals only in an operating point of the electric motor at maximum power, whereas pulse width modulation is applied in operating points of a lower power range and overmodulation is applied in operating points of an upper power range.

In some embodiments, the power electronics is configured to operate an electric motor of a drive system in a method as described herein. Accordingly, the power electronics are configured to selectively apply clock signals at any operating point of the electric motor. In this manner, the power electronics allows a rapid heating of a rotor and/or a stator of the electric motor as well as of an oil flowing through the electric motor at any operating point.

Another embodiment is a vehicle with an electric drive system comprising a traction battery, an electric motor and power electronics. Such vehicles are widely used and will become much more numerous in the future. Accordingly, there are more and more possible applications of the embodiments described herein.

In some embodiments, the drive system comprises power electronics as described herein. Thanks to the power electronics as described herein, the traction battery is rapidly heated independently of an operating point of the electric motor.

A significant advantage of the method described herein is that it allows power electronics to heat a rotor very effectively without deliberately superimposing additional harmonics of the rotor rotational frequency on an alternating current voltage supplied to the stator. A further advantage of the method is that the power electronics does not need to provide a new timing of the generated alternating current voltage when executing the method, but only needs to selectively provide a controlled timing, namely clock signals, independent of an operating point of the electric motor. Correspondingly, existing power electronics can easily be adapted to the method described herein.

DETAILED DESCRIPTION

Figure 1:
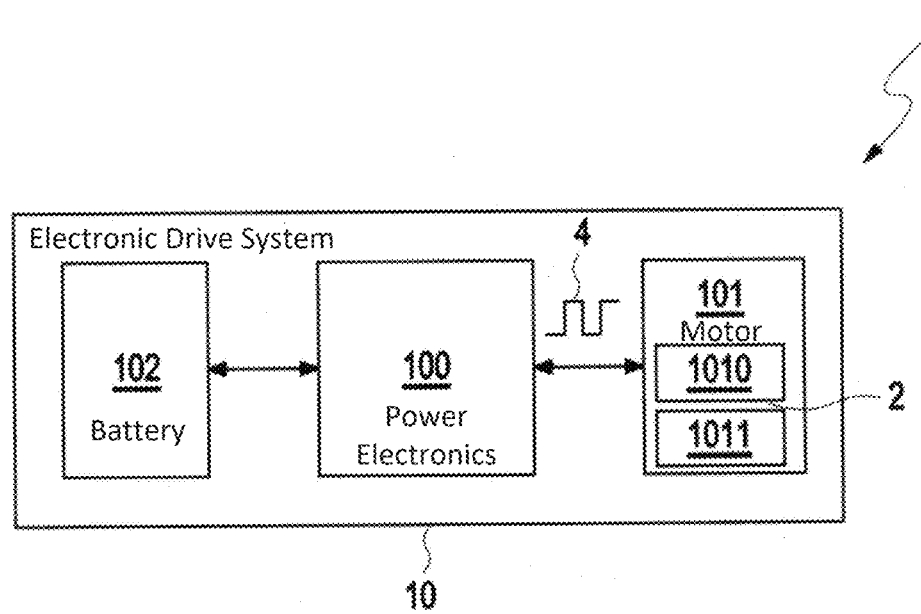
FIG. 1 shows a vehicle according to one embodiment in a partial block diagram.

FIG. 1 shows a vehicle 1 according to one embodiment in a partial block diagram. The vehicle 1 is electrically drivable and comprises an electric drive system 10 having a traction battery 102, an electric motor 101, and power electronics 100. The electric motor 101 comprises a rotor 1010 and a stator 1011 and may be configured as a permanently excited synchronous motor, a synchronous reluctance motor, or an externally excited synchronous motor. The rotor 1010 and the stator 1011 may have an oil 2 flowing around them.

The power electronics 100 are suitable for the drive system 10 and configured to operate the electric motor 101 in a method as described herein.

The power electronics 100 of the drive system 10 operate the electric motor 101 of the drive system 10 by means of clock signals 4.

Figure 2:
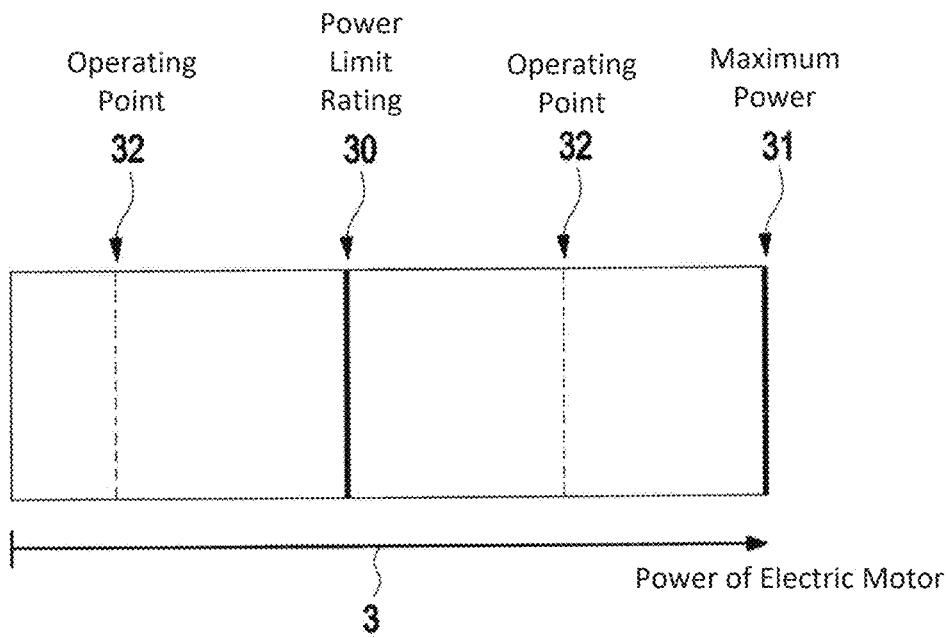
FIG. 2 shows a bar graph of a power range of the electric motor shown in FIG. 1.

FIG. 2 shows a bar graph of a power range 3 of the electric motor 101 shown in FIG. 1. The power range 3 comprises a maximum power 31 of the electric motor 101 and a limit power rating 30 of the electric motor 101, which is lower than the maximum power 31.

At the maximum power 31, the power electronics 100 operate the electric motor 101 with the clock signals 4. Below the limit power rating 30, the power electronics 100 may provide pulse width modulation as a timing of the alternating current voltage for normal operation of the electric motor 101. Above the limit power rating 30, the power electronics 100 may provide overmodulation as a timing of the alternating current voltage for normal operation of the electric motor 101.

The electric motor 101 is selectively operated by means of the clock signals 4, by the power electronics 100 at each operating point 32 of the electric motor 101.

Thus, the power electronics 100 may provide the clock signals 4 for an operating point 32 with a power of the electric motor 101 below the maximum power 31 of the electric motor 101.

The power electronics 100 may further provide the clock signals 4 for an operating point 32 with a power of the electric motor 101 below the limit power rating 30 of the electric motor 101 for one pulse width modulation instead of the pulse width modulation.

Further, the power electronics 100 may provide the clock signals 4 for an operating point 32 with a power 3 of the electric motor 101 above a limit power rating 30 of the electric motor 101 for pulse width modulation instead of overmodulation.

At least one flux harmonic of the clock signals 4 may have a d component in a d/q reference frame rotating with the rotor 1010.

The power electronics 100 may use the clock signals 4 to heat the rotor 1010 and/or the stator 1011 of the electric motor 101.

In particular, the rotor 1010 and/or the stator 1011 may heat an oil 2 disposed in the electric motor 101 and flowing around the rotor 1010 and/or the stator 1011 to heat the traction battery 102 of the vehicle 1.

Depending on the embodiment of the vehicle 1, a permanently excited synchronous motor, a synchronous reluctance motor, or an externally excited synchronous motor may be operated as the electric motor 101.

Figure 3:
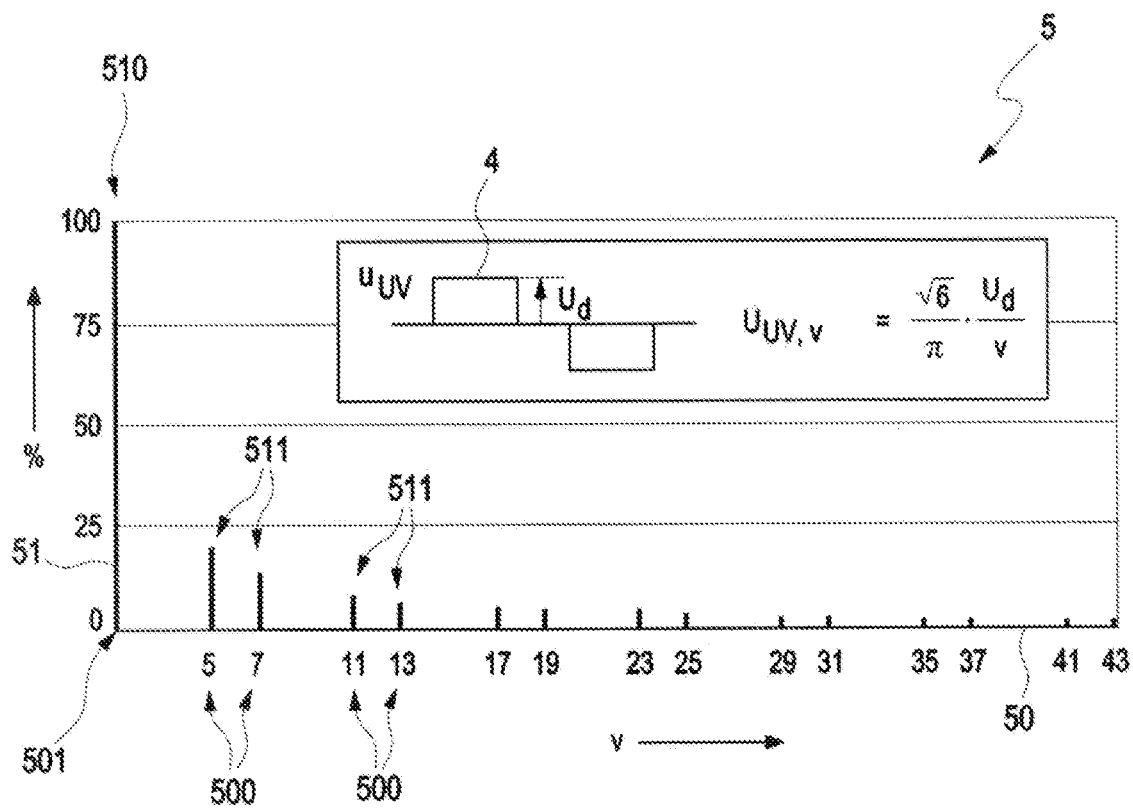
FIG. 3 shows a spectral diagram of clock signals provided by the power electronics shown in FIG. 1.

FIG. 3 shows a spectral diagram 5 of clock signals 4 provided by the power electronics 100 shown in FIG. 1. By way of example, the clock signals 4 are shown in the form of a square-wave voltage $U_{UV}$ having an amplitude $U_d$.

The spectral diagram 5 comprises an abscissa 50, on which integer multiples 500, which is to say harmonics of order v, of a rotational frequency 501 of the rotor 1010, which is to say a fundamental oscillation, are plotted, and an ordinate 51, on which amplitudes 510, 511 respectively assigned to the orders v are plotted, and shows a bar-shaped spectrum of the clock signals 4 shown.

The rotational frequency 501 is assigned an amplitude 510 of magnitude 100%. The integer multiples 500 are each assigned amplitudes 500 of smaller magnitudes than 100%, which decrease inversely proportional to the order v. For example, it can be read that the two lowest harmonics of orders 5 and 7 are assigned amplitudes of respectively 20% and 14%. The lowest harmonics of the clock signals 4 provide the main contribution to the heating of the rotor 1010 of the electric motor 101.

German patent application no. 10 2021 130907.7, filed Nov. 25, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an electric motor, comprising:
   operating, by power electronics of a drive system, an electric motor of the drive system at a first operating point of the electric motor using pulse width modulation or by providing a square-wave alternating current voltage to the electric motor; and
   operating, by the power electronics of the drive system, the electric motor of the drive system at a second operating point of the electric motor using overmodulation or by providing the square-wave alternating current voltage to the electric motor,
   wherein pulse width modulation is used to operate the electric motor at the first operating point of the electric motor during normal operation of the electric motor,
   wherein the square-wave alternating current voltage is provided to the electric motor instead of using pulse width modulation to operate the electric motor at the first operating point of the electric motor during heat generation operation of the electric motor,
   wherein overmodulation is used to operate the electric motor at the second operating point of the electric motor during normal operation of the electric motor,
   wherein the square-wave alternating current voltage is provided to the electric motor instead of using overmodulation to operate the electric motor at the second operating point of the electric motor during heat generation operation of the electric motor, wherein the first operating point of the electric motor is different from the second operating point of the electric motor, wherein the first operating point is below a limit power rating of the electric motor for pulse width modulation, and wherein the second operating point is above the limit power rating of the electric motor for pulse width modulation.

2. The method according to claim 1, wherein, while the power electronics operate the electric motor at one of the first operating point or the second operating point, a power of the electric motor is below a maximum power of the electric motor.

3. The method according to claim 1, further comprising:

inducing, by the square-wave alternating current voltage, eddy currents in a rotor and/or a stator of the electric motor; and heating, by the eddy currents, the rotor and/or the stator of the electric motor.

4. The method according to claim 3, wherein, while the power electronics operate the electric motor at the first operating point and the second operating point, at least one flux harmonic of the square-wave alternating current voltage provided to the electric motor in a d/q reference system rotating with the rotor has a d component, and wherein the d component indicates a magnetic flux that does not apply a torque to the rotor.

5. The method according to claim 3, further comprising:

heating, by the rotor and/or the stator, an oil arranged in the electric motor and flowing around the rotor and/or the stator; and heating, by the oil heated by the rotor and/or the stator, a traction battery of an electrically drivable vehicle.

6. The method according to claim 1, wherein the electric motor is a permanently excited synchronous motor, a synchronous reluctance motor, or an externally excited synchronous motor.

7. A drive system comprising:

power electronics; and an electric motor coupled to the power electronics, wherein the power electronics, in operation, operate the electric motor at a first operating point of the electric motor using pulse width modulation or by providing a square-wave alternating current voltage to the electric motor, wherein the power electronics, in operation, operate the electric motor at a second operating point of the electric motor using overmodulation or by providing the square-wave alternating current voltage to the electric motor, wherein pulse width modulation is used to operate the electric motor at the first operating point of the electric motor during normal operation of the electric motor, wherein the square-wave alternating current voltage is provided to the electric motor instead of using pulse width modulation to operate the electric motor at the first operating point of the electric motor during heat generation operation of the electric motor, wherein overmodulation is used to operate the electric motor at the second operating point of the electric motor during normal operation of the electric motor, wherein the square-wave alternating current voltage is provided to the electric motor instead of using overmodulation to operate the electric motor at the second operating point of the electric motor during heat generation operation of the electric motor, wherein the first operating point of the electric motor is different from the second operating point of the electric motor, wherein the first operating point is below a limit power rating of the electric motor for pulse width modulation, and wherein the second operating point is above the limit power rating of the electric motor for pulse width modulation.

8. A vehicle comprising:

a traction battery; and the drive system according to claim 7.

* * * * *